United States Patent
Paluncic

(10) Patent No.: US 8,608,453 B2
(45) Date of Patent: Dec. 17, 2013

(54) FEED PUMP AND MODULAR PUMP SYSTEM

(75) Inventor: Zdravko Paluncic, Ludwigshafen (DE)

(73) Assignee: Lincoln GmbH, Walldorf (DE)

( * ) Notice: Subject to any disclaimer, the term of this patent is extended or adjusted under 35 U.S.C. 154(b) by 834 days.

(21) Appl. No.: 12/095,348

(22) PCT Filed: Sep. 20, 2006

(86) PCT No.: PCT/EP2006/009129
§ 371 (c)(1),
(2), (4) Date: Aug. 19, 2008

(87) PCT Pub. No.: WO2007/062705
PCT Pub. Date: Jun. 7, 2007

(65) Prior Publication Data
US 2009/0162216 A1  Jun. 25, 2009

(30) Foreign Application Priority Data
Nov. 30, 2005  (DE) ............... 20 2005 018 630 U

(51) Int. Cl.
F04B 19/00 (2006.01)
F04B 37/00 (2006.01)

(52) U.S. Cl.
USPC .......................................... 417/238

(58) Field of Classification Search
USPC ......... 417/350, 360, 393, 397, 404, 418, 225, 417/238
See application file for complete search history.

(56) References Cited

U.S. PATENT DOCUMENTS

| | | | |
|---|---|---|---|
| 4,632,648 A * | 12/1986 | Goyne | 417/502 |
| 5,038,892 A * | 8/1991 | Maloney | 184/7.4 |
| 5,205,378 A | 4/1993 | Boelkins | |
| 5,482,443 A | 1/1996 | Bez | |
| 5,626,467 A * | 5/1997 | Cantley | 417/312 |
| 5,632,605 A | 5/1997 | Bez | |
| 5,662,023 A * | 9/1997 | Carson et al. | 92/59 |
| 5,725,071 A | 3/1998 | Brice | |
| 5,782,616 A * | 7/1998 | Yoo | 417/364 |

(Continued)

FOREIGN PATENT DOCUMENTS

CN  2639569 Y  9/2004
DE  69317677 T2  8/1998
(Continued)

OTHER PUBLICATIONS

Search Report regarding German Utility Model 202005018630.9, 4 pages.
(Continued)

*Primary Examiner* — Charles Freay
*Assistant Examiner* — Amene Bayou
(74) *Attorney, Agent, or Firm* — Senniger Powers LLP

(57) ABSTRACT

The invention relates to a feed pump for supplying lubricant to at least one lubricating point, with at least one driving module and at least one pump module. Each driving module and each pump module is selected from a modular system which comprises a plurality of driving modules and/or a plurality of pump modules which each have at least one connecting region. In this case, the connecting regions are matched to one another in such a manner that the at least one driving module can be exchanged for at least one further driving module and/or the at least one pump module can be exchanged for at least one further pump module.

4 Claims, 4 Drawing Sheets

(56) References Cited

U.S. PATENT DOCUMENTS

| | | | |
|---|---|---|---|
| 6,176,348 B1 * | 1/2001 | Grebe et al. | 184/27.2 |
| 6,322,336 B1 * | 11/2001 | Huss | 417/442 |
| 6,698,551 B2 | 3/2004 | Clancy | |
| 6,736,292 B2 | 5/2004 | Grach | |
| 7,347,186 B2 * | 3/2008 | Ricco et al. | 123/446 |
| 2002/0144865 A1 * | 10/2002 | Clancy et al. | 184/55.1 |
| 2003/0039561 A1 * | 2/2003 | Batten et al. | 417/393 |

FOREIGN PATENT DOCUMENTS

| | | | |
|---|---|---|---|
| DE | 19834599 A1 | 2/2000 | |
| DE | 69106916 T2 | 3/2010 | |
| EP | 0449692 A1 | 10/1991 | |
| EP | 0493982 A1 | 7/1992 | |
| EP | 1275895 A1 | 1/2003 | |

OTHER PUBLICATIONS

International Search Report regarding application No. PCT/EP2006/009129 dated Nov. 27, 2006, 5 pages.

International Preliminary Report on Patentability issued in Application No. PCT/EP2006/009129 (German text with English translation attached), 13 pages.

Office action dated Sep. 28, 2009 regarding Chinese Patent Application 200680042929.4, 3 pages.

* cited by examiner

FEED PUMP AND MODULAR PUMP SYSTEM

BACKGROUND OF THE INVENTION

The invention pertains to a feed pump for supplying lubricant to at least one lubricating point which features at least one driving module and at least one pump module. The invention furthermore pertains to a modular pump system for a feed pump of this type.

Feed pumps for supplying lubricants such as, for example, lubricating grease or oil usually feature a pump element that is formed, for example, by a delivery piston that supplies the lubricant to a lubricating point, as well as a drive element that is assigned to this pump element and serves for actuating the pump element. For example, U.S. Pat. No. 6,736,292 B2 discloses a grease pump in which a pneumatically actuated driving element in the form of a piston is arranged in a common housing with a pump element realized in the form of a delivery piston. If the pump element and/or the driving element needs to be exchanged due to a defect, it is imperative that a specific pump element or driving element suitable for this purpose be used. Consequently, replacement parts that are specially adapted to different feed pumps must be available. In addition, feed pumps of this type are designed for a certain operating mode, e.g., due to the pneumatically or hydraulically operated driving element, and cannot be readily driven, e.g., mechanically and/or electrically. Known feed pumps are furthermore designed for a certain lubricant.

SUMMARY OF THE INVENTION

The present invention, in contrast, is based on the objective of developing a feed pump and a modular pump system for a feed pump of this type which can be flexibly utilized with respect to the type of drive and with respect to the lubricants. In addition, it should be possible to easily exchange individual components of the feed pump in order to convert the feed pump to different operating conditions and/or for repair purposes.

According to the invention, this objective is essentially attained with a feed pump that features at least one driving module and at least one pump module, wherein each driving module and each pump module is selected from a modular system that comprises a plurality of driving modules and/or a plurality of pump modules, each of which features at least one connecting region, and wherein the connecting regions are adapted to one another in such a way that the at least one driving module can be exchanged for at least one other driving module and/or the at least one pump module can be exchanged for at least one other pump module.

Additional refinements, advantages and possible applications of the invention are described below with reference to embodiments illustrated in the figures. In this case, all described and/or graphically illustrated characteristics form the object of the invention individually or in arbitrary combinations, namely regardless of their combination in the claims or their reference to other claims.

BRIEF DESCRIPTION OF THE DRAWINGS

Schematically shown are.

DETAILED DESCRIPTION

Figure 1:
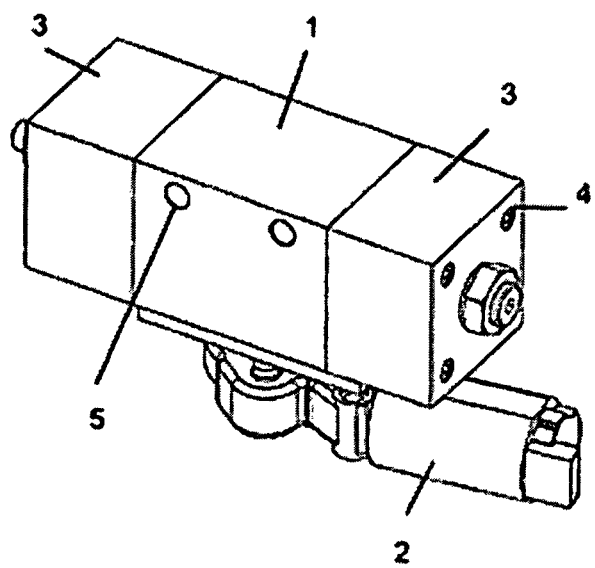
FIG. 1, a perspective representation of an inventive feed pump with an electric motor.

The feed pump illustrated in FIG. 1 comprises a driving module 1, to which an electric motor 2 is assigned, and two pump modules 3 that are mounted on two opposite sides of the driving module 1. The pump modules may be designed, for example, for supplying oil, lubricating grease or another suitable lubricant. For this purpose, the pump elements 3 may feature fittings (not shown) for connection to a lubricating grease cartridge or the like or to an oil tank. The pump modules 3 may furthermore be provided with outlets that are respectively connected to a lubricating point by means of a lubricant line (not shown).

According to FIG. 1, the two respective pump modules 3 are separably mounted on the driving module 1 by means of four bolts 4. In addition, the driving module 1 is provided with two mounting bores 5 that make it possible to fix the entire feed pump. The control of the electric motor 2 can be realized with an assigned control and regulating unit.

Figure 2:
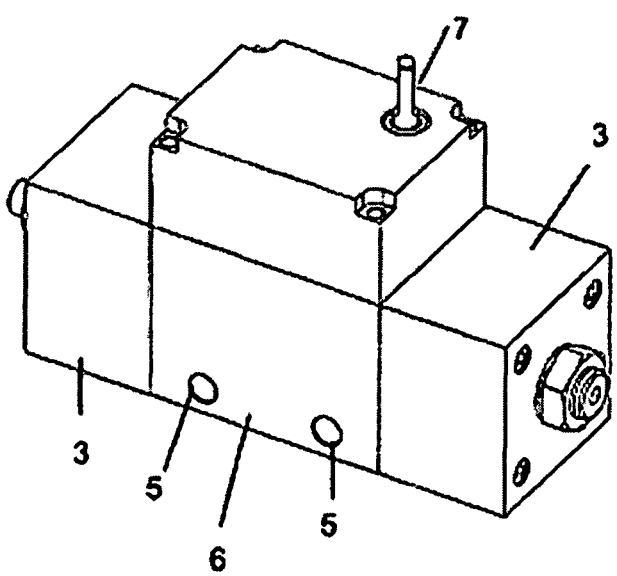
FIG. 2, a perspective representation of an inventive feed pump with a free shaft end.
Figure 3:
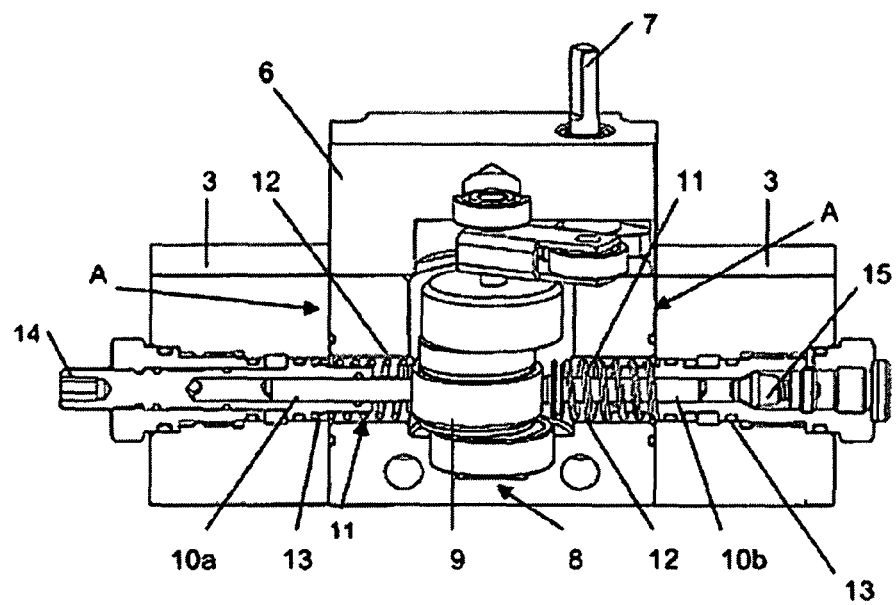
FIG. 3, a section through the feed pump according to FIG. 2.

FIGS. 2 and 3 show another embodiment of a feed pump, in which two pump modules 3 are connected to opposite sides of a driving module 6. The driving module 6 is not provided with its own drive in this case, but rather features a shaft end 7 that protrudes from the upper side of the housing and can be connected to a driving element.

The driving module 6 features a rotary motion-linear motion conversion gear 8 with a contact wheel 9 that is eccentrically arranged on a shaft supported in the driving module 6. The rotary motion of the shaft end 7 is thusly converted into a linear motion of two delivery pistons 10a, 10b arranged in the two pump modules 3.

A spring 11 is respectively assigned to the delivery pistons 10a, 10b in such a way that the spring force maintains the contact between the piston and the eccentric contact wheel 9. This means that the two delivery pistons 10a and 10b are alternately displaced into the respective pump modules 3 against the force of the pressure springs 11 during one revolution of the eccentric contact wheel 9. This piston stroke of the delivery pistons 10a, 10b conventionally supplies a lubricant to a lubricating point from a grease cartridge, an oil tank or the like.

According to FIG. 3, both delivery pistons 10a and 10b protrude into the driving module through bores 12 in order to contact the rotary motion-linear motion conversion gear 8. The respective pump modules 3 are also provided with a bore 13, in which the piston arrangement with the delivery pistons 10a and 10b is accommodated. The piston arrangement of the left delivery piston 10a in FIG. 3 can be adjusted with the aid of an adjusting screw 14. The piston arrangement of the right pump module in FIG. 3, in contrast, is not realized in an adjustable fashion. In addition, a valve 15 is illustrated in this piston arrangement of the delivery piston 10b.

The facing surfaces of the pump modules 3 and the driving module 6 form connecting regions A, in which the bores 12 and 13 and the bores for accommodating the bolts 4 are arranged. In this case, these bores are arranged in the connecting regions A such that the pump modules 3 can be easily detached from the driving module 6 in order to be exchanged for other pump modules by removing the bolts 4. The pump modules or driving modules can be easily exchanged due to the matched connecting regions A.

Figure 4:
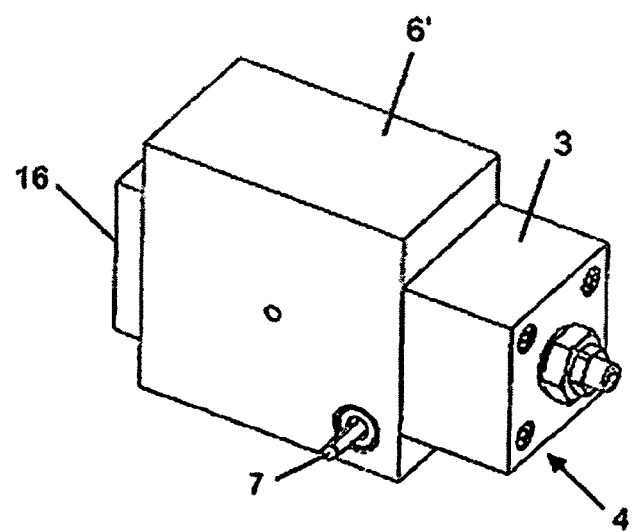
FIG. 4, a perspective representation of another embodiment of a feed pump with a free shaft end.
Figure 5:
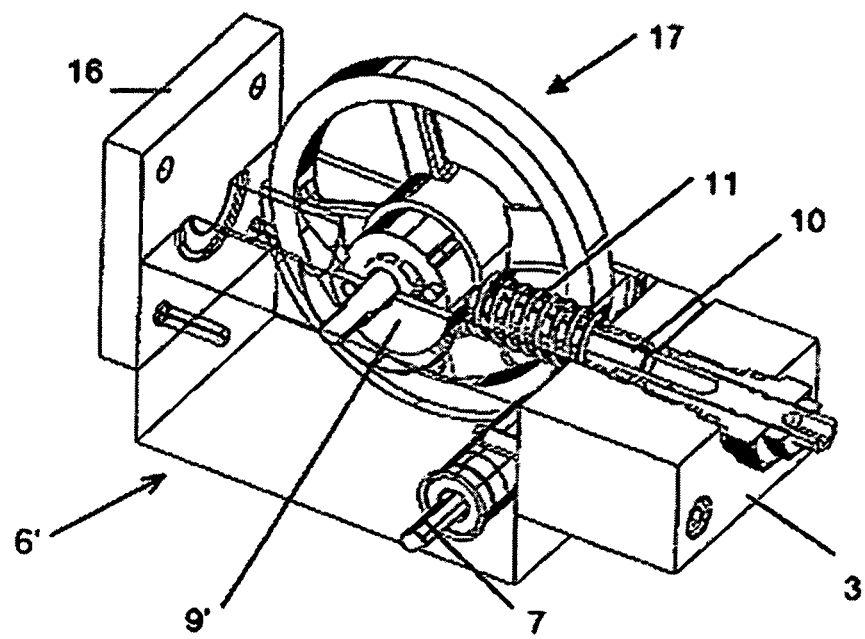
FIG. 5, a sectioned perspective representation of the feed pump according to FIG. 4.

FIGS. 4 and 5 show another embodiment of a feed pump, in which the driving module 6' features a free shaft end 7 that protrudes from a lateral surface of the housing of the driving module 6' in order to be connected to a driving element. In this case, only one pump module 3 is mounted on the right side of the driving module 6' referred to in the figure. The opposite connecting region A of the driving module 6' is closed with the aid of a cover 16.

According to FIG. 5, the driving module 6' features a rotary motion-linear motion conversion gear 17 with a gear pair consisting of a first gear arranged on the free shaft end 7 and a second gear arranged on another shaft. In this case, an eccentric contact wheel 9' that is in contact with the delivery piston 10 due to the force of the spring 11 is assigned to the second gear.

Figure 6:
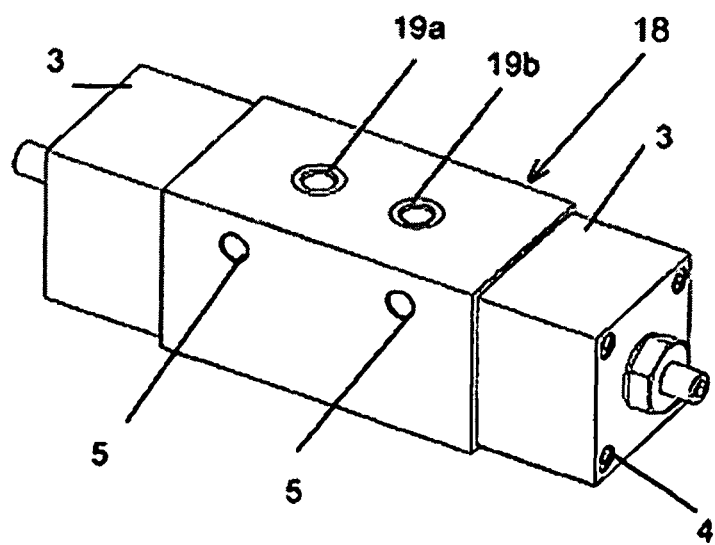
FIG. 6, a perspective representation of an inventive feed pump with a hydraulically and/or pneumatically operated driving module.

Two other embodiments of the inventive feed pump that feature a driving module 18 and two pump modules 3 mounted thereon are described below with reference to FIGS. 6 to 8. The driving module 18 is provided with two connections 19*a* and 19*b* for supplying and/or discharging a hydraulic fluid or, for example, compressed air.

Figure 7:
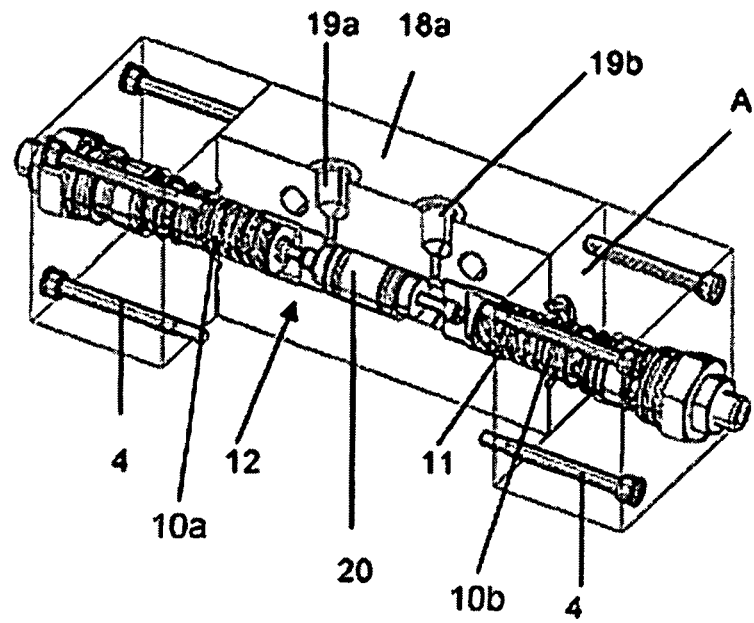
FIG. 7, a partially sectioned perspective representation of a driving module with a double-acting piston arrangement, and FIG. 8, a partially sectioned perspective representation of a driving module with a single-acting piston arrangement.

In the embodiment shown in FIG. 7, a double-acting piston 20 is arranged in the driving module 18*a* and can be moved back and forward in the axial direction in the driving module 18*a* by supplying and/or discharging a fluid through the connections 19*a* and 19*b*. This causes the piston 20 to alternately press one of the delivery pistons 10*a* and 10*b* outward in order to thusly supply a lubricant.

Figure 8:
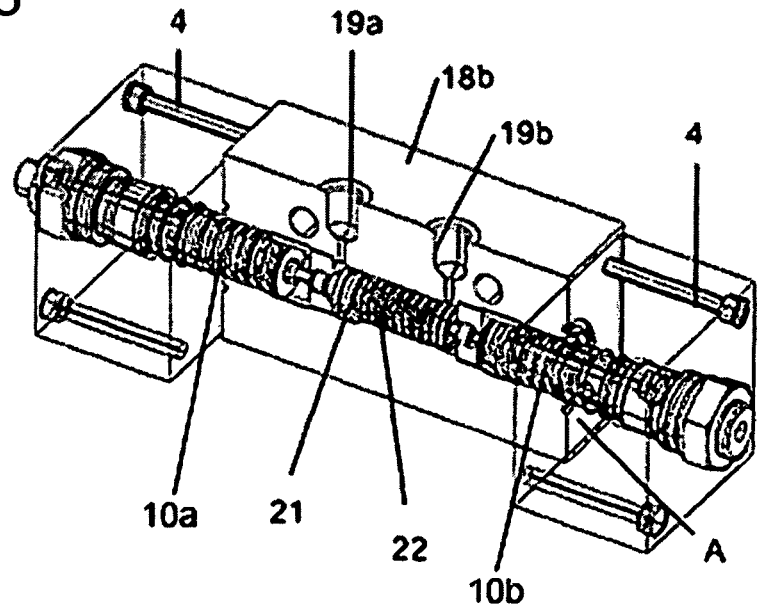

FIG. 8 shows an embodiment, in which a single-acting piston 21 is displaceably arranged in the driving module 18*b*. A pressure spring 22 assigned to the piston 21 acts upon the piston 21 to urge it toward the left as viewed in the figure. The piston 21 is once again alternately displaced toward the left and the right as viewed in the figure by supplying and discharging a fluid through the connections 19*a* and 19*b* in order to thusly actuate the delivery pistons 10*a* and 10*b* that are in contact with said piston.

In the feed pumps illustrated in the figures, the different driving modules can be easily interchanged because the connecting regions A of the driving modules and the pump modules are adapted to one another. In addition, it is possible to change the number of pump modules connected to a driving module and/or the type of pump modules, for example, to exchange a pump module for supplying grease or a pump module for supplying oil for each other. The interchangeability of the individual modules makes it possible to quickly adapt feed pumps to different operating conditions. In addition, individual modules can also be easily exchanged for maintenance and repair purposes.

It will be observed from the foregoing that the modular design of the inventive pump makes it possible to easily exchange the modular components of the pump with different or identical components. This makes it possible to quickly fit the pump with different drive modules or to exchange pump modules. Furthermore, the number of pump modules on a driving module can be increased or decreased depending on the operating conditions. In order to simplify this interchangeability of the modules, each of the modules features at least one connecting region that is adapted to the connecting regions of the remaining modules.

It is preferred that the connecting regions respectively feature at least one bore for producing a separable connection between a driving module and a pump module with the aid of a bolt. A particularly secure connection between the individual modules can be achieved if the modules are attached to one another with a total of four bolts. In this case, the bores in the connecting regions are realized such that the pump modules feature through-bores for accommodating and leading through bolts while the driving modules are provided with threaded bores. The pump modules can be easily bolted to the driving modules in this fashion.

According to the invention, it is furthermore proposed that the connecting regions respectively feature another bore for accommodating and/or leading through a piston or a piston arrangement. In this case, the pump modules may be equipped with a delivery piston arrangement that at least partially protrudes from the connecting region of each pump module and can be inserted into the corresponding bore of a driving module in order to engage with or contact a driving element for actuating the piston arrangement at this location. In other words, the pump modules merely need to be attached to a driving module, wherein a piston that protrudes from the bore of the pump module is inserted, for example, into the bore of the driving module and then bolted to the pump module. This allows a particularly simple exchange of pump modules or driving modules.

According to the invention, the connecting regions form an essentially plane surface. In this case, the compatible connecting regions essentially have the same size and shape. This makes it possible to easily exchange pump modules and driving modules.

According to one preferred embodiment of the invention, the driving module features a rotary motion-linear motion conversion gear and an electric motor assigned thereto. In this case, the rotary motion of the motor shaft of the electric motor is converted into a linear motion for driving a piston arrangement of a pump module. According to one additional refinement of this embodiment, it is proposed that a control and/or regulating unit be assigned to the electric motor.

Alternatively, the driving module may also feature a rotary motion-linear motion conversion gear that can preferably be driven by a shaft end protruding from the housing of the driving module. The driving module may also feature a receptacle for inserting and connecting a driven shaft end or the like. Driving units are already provided in many devices for which the lubricating points need to be supplied with lubricant by means of an inventive feed pump. Consequently, it is possible to also use the driving energy of these units for operating feed pumps for supplying lubricant. An additional electric motor for driving the feed pump can be eliminated in this case.

The rotary motion-linear motion conversion gear may be realized, for example, in the form of an eccentric element that is rotatably supported in the driving module, e.g., a cam or the like. Any device that is able to convert a rotary motion into a linear motion is suitable, in principle, for use in a driving module. Furthermore, the rotary motion-linear motion conversion gear and/or an additional gear makes it possible to realize a defined adjustment of the speed of the linear motion at a predetermined rotary speed of the driving element.

According to another embodiment of the invention, the driving module features a hydraulically and/or pneumatically driven piston arrangement. The utilization of such a driving module is advantageous in all instances in which a hydraulic fluid or, for example, compressed air, is made available for operating and/or controlling the device to which the feed pump is assigned.

The hydraulically and/or pneumatically driven piston arrangement may feature a double-acting piston that is displaceably guided in the driving module. For this purpose, a four-way valve may be assigned, for example, to the driving unit. Alternatively, it would also be possible to provide a piston that is displaceably guided in the driving module and to which a pull-back spring is assigned. This reduces the control expenditure of such a driving module.

According to one preferred embodiment, the pump module of one inventive feed pump features a delivery piston that is displaceably supported in the module and to which a pull-back spring and at least one valve are assigned. When the delivery piston is actuated, it supplies a lubricant such as, for example, oil or lubricating grease to a lubricating point. The force of the pull-back spring causes the delivery piston to be displaced back into its position in which it protrudes into the driving module, when the driving module no longer acts upon the delivery piston. The pull-back spring makes it possible to maintain under prestress the functional connection between the delivery piston and a driving element of the driving module such as, for example, a cam.

The objective of the invention is also attained with a modular pump system for a feed pump which comprises at least two driving modules (1, 6, 6', 18a, 18b) and at least one pump module or at least one driving module (1, 6, 6', 18a, 18b) and at least two pump modules. In this case, each driving module and each pump module features at least one connecting region that is configured with respect to the connecting regions of the remaining modules in such a way that any driving module is capable of being exchanged for at least one other driving module and any pump module is capable of being exchanged for at least one other pump module. In order to drive several pump modules by means of only one driving module, if so required, it is preferred that the driving modules feature at least two connecting regions. For example, it is possible for each driving module to feature 2, 4 or, for example, 6 connecting regions for respectively connecting one pump module. Connecting regions with no pump module connected thereto can be closed by means of a cover in order to prevent the admission of dirt.

REFERENCE SYMBOLS

1 Driving module
2 Electric motor
3 Pump module
4 Bolt
5 Mounting bore
6, 6' Driving module
7 Free shaft end
8 Rotary motion-linear motion conversion gear
9, 9' Eccentric contact wheel
10, 10a, 10b Delivery piston
11 Pressure spring
12 Bore
13 Bore
14 Adjusting screw
15 Valve
16 Cover
17 Rotary motion-linear motion conversion gear
18, 18a, 18b Driving module
19a, 19b Connection
20 Double-acting piston
21 Piston
22 Spring
A Connecting region

What is claimed is:

1. A feed pump for supplying lubricant to at least one lubricating point, the feed pump comprising at least one driving module and at least one pump module, each of which modules is selected from a modular system that comprises at least first and second driving modules and the at least one pump module, wherein each of the driving and pump modules of the modular system comprises at least one connecting region, and wherein the connecting regions are configured in such a way that one of the first and second driving modules is capable of being exchanged for the other of the first and second driving modules, wherein the at least one pump module comprises a piston, wherein the first driving module comprises a rotary motion-linear motion conversion gear in contact with the piston of the at least one pump module when the first driving module is connected to the at least one pump module at respective connecting regions, and wherein the second driving module comprises a hydraulically and/or pneumatically driven piston arrangement for driving the piston of the at least one pump module when the second driving module is connected to the at least one pump module at respective connecting regions.

2. The feed pump according to claim 1, characterized by the fact that the at least one pump module comprises a displaceably supported delivery piston and a pull-back spring is connected to the delivery piston.

3. The feed pump according to claim 2, characterized by the fact that the delivery piston protrudes form the connecting region of the pump module and into the first or second driving module in such a way that the delivery piston is in contact with a driving element in the driving module.

4. A modular pump system from which lubricant feed pumps having different arrangements of modules can be assembled, the modular system comprising at least two driving modules and at least one pump module, each of which driving modules and the at least one pump module comprising at least one connecting region, and wherein the connecting regions are configured in such a way that either of the at least two driving modules is capable of being exchanged for the other of the at least two driving modules, wherein the at least one pump module comprises a piston, wherein a first driving module of the at least two driving modules comprises a rotary motion-linear motion conversion gear in contact with the piston of the at least one pump module when the first driving module is connected to the at least one pump module at respective connecting regions to assemble a feed pump having a first arrangement of modules, and wherein a second driving module of the at least two driving modules comprises a hydraulically and/or pneumatically driven piston arrangement for driving the piston of the at least one pump module when the second driving module is connected to the at least one pump module at respective connecting regions to assemble a feed pump having a second arrangement of modules.

* * * * *